US012631202B2

(12) United States Patent
Ivankovic et al.

(10) Patent No.: US 12,631,202 B2
(45) Date of Patent: May 19, 2026

(54) FASTENING SYSTEM

(71) Applicant: PRATT & WHITNEY CANADA CORP., Longueuil (CA)

(72) Inventors: Milos Ivankovic, Toronto (CA); Gerard Theriault, Longueuil (CA); Robert Venditti, Woodbridge (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 575 days.

(21) Appl. No.: 17/951,835

(22) Filed: Sep. 23, 2022

(65) Prior Publication Data
US 2025/0003436 A1      Jan. 2, 2025

(51) Int. Cl.
| | |
|---|---|
| *F16D 1/076* | (2006.01) |
| *F16B 5/02* | (2006.01) |
| *F16B 37/04* | (2006.01) |
| *F16B 43/02* | (2006.01) |

(52) U.S. Cl.
CPC .............. *F16B 5/02* (2013.01); *F16B 37/042* (2013.01); *F16B 43/02* (2013.01); *F16D 1/076* (2013.01); *F16B 2200/506* (2018.08)

(58) Field of Classification Search
CPC .......... F16B 5/0004; F16B 5/02; F16B 37/04; F16B 37/042; F16B 41/002; F16B 43/00; F16B 43/02; F16B 2200/506; F16D 1/076
USPC ....... 411/337, 366.1, 368, 369–370; 403/337
See application file for complete search history.

(56) References Cited

U.S. PATENT DOCUMENTS

| | | | | | |
|---|---|---|---|---|---|
| 960,899 | A | * | 6/1910 | Guyer ................. | F16L 27/0849 |
| | | | | | 411/537 |
| 3,107,950 | A | * | 10/1963 | Kleven ................... | F16C 17/22 |
| | | | | | 384/129 |
| 3,220,289 | A | * | 11/1965 | Farekas ................... | F16C 35/08 |
| | | | | | 411/537 |
| 3,239,036 | A | | 3/1966 | Scott | |
| 3,382,630 | A | | 5/1968 | Chivers | |
| 3,422,721 | A | * | 1/1969 | Yonkers ................. | F16B 43/02 |
| | | | | | 411/537 |
| 4,028,909 | A | * | 6/1977 | Jancic ....................... | F16D 1/04 |
| | | | | | 464/33 |
| 4,058,023 | A | * | 11/1977 | Smith ..................... | F16H 55/12 |
| | | | | | 474/902 |

(Continued)

FOREIGN PATENT DOCUMENTS

EP            3219911            9/2017

*Primary Examiner* — Flemming Saether
(74) *Attorney, Agent, or Firm* — NORTON ROSE FULBRIGHT CANADA LLP

(57) ABSTRACT

A fastening system for an aircraft includes first and second parts of the aircraft, a bolt hole including a bolt countersink and being defined by a bolt hole surface of the first part, a nut hole including a nut countersink and being defined by a nut hole surface of the second part, a bolt having a shank including threads, and a bolt head with an undersurface complementarily shaped to the bolt countersink, and a nut having threads and having a nut chamfer complementarily shaped to the nut countersink, the shank being dimensioned relative to the first and second parts, the bolt hole and the nut hole such that the shank is spaced from one of or both of the bolt hole surface and the nut hole surface. A method of fastening a first aircraft part with a second aircraft part using a bolt and a nut is also described.

6 Claims, 10 Drawing Sheets

(56) References Cited

U.S. PATENT DOCUMENTS

| | | | | |
|---|---|---|---|---|
| 4,630,168 A * | 12/1986 | Hunt | ..................... | B64D 45/02 |
| | | | | 244/1 A |
| 4,746,239 A * | 5/1988 | Marquardt | ............. | F16B 39/28 |
| | | | | 411/546 |
| 4,869,632 A | 9/1989 | Radtke | | |
| 4,891,732 A | 1/1990 | Jones | | |
| 5,651,629 A * | 7/1997 | Wall | ........................ | F16D 1/033 |
| | | | | 464/33 |
| 7,056,053 B2 | 6/2006 | Schilling et al. | | |
| 8,944,735 B2 * | 2/2015 | Sugimoto | ............. | F16B 33/004 |
| | | | | 411/914 |
| 2011/0131898 A1 * | 6/2011 | Nies | ........................ | F16B 5/025 |
| | | | | 52/173.1 |
| 2012/0082542 A1 | 4/2012 | Misawa | | |
| 2013/0108394 A1 * | 5/2013 | Zhu | ......................... | F16B 35/06 |
| | | | | 411/366.1 |
| 2014/0338179 A1 * | 11/2014 | Whitlock | .............. | B64D 45/02 |
| | | | | 470/11 |
| 2020/0080475 A1 * | 3/2020 | Baladi | ....................... | F02C 3/04 |

* cited by examiner

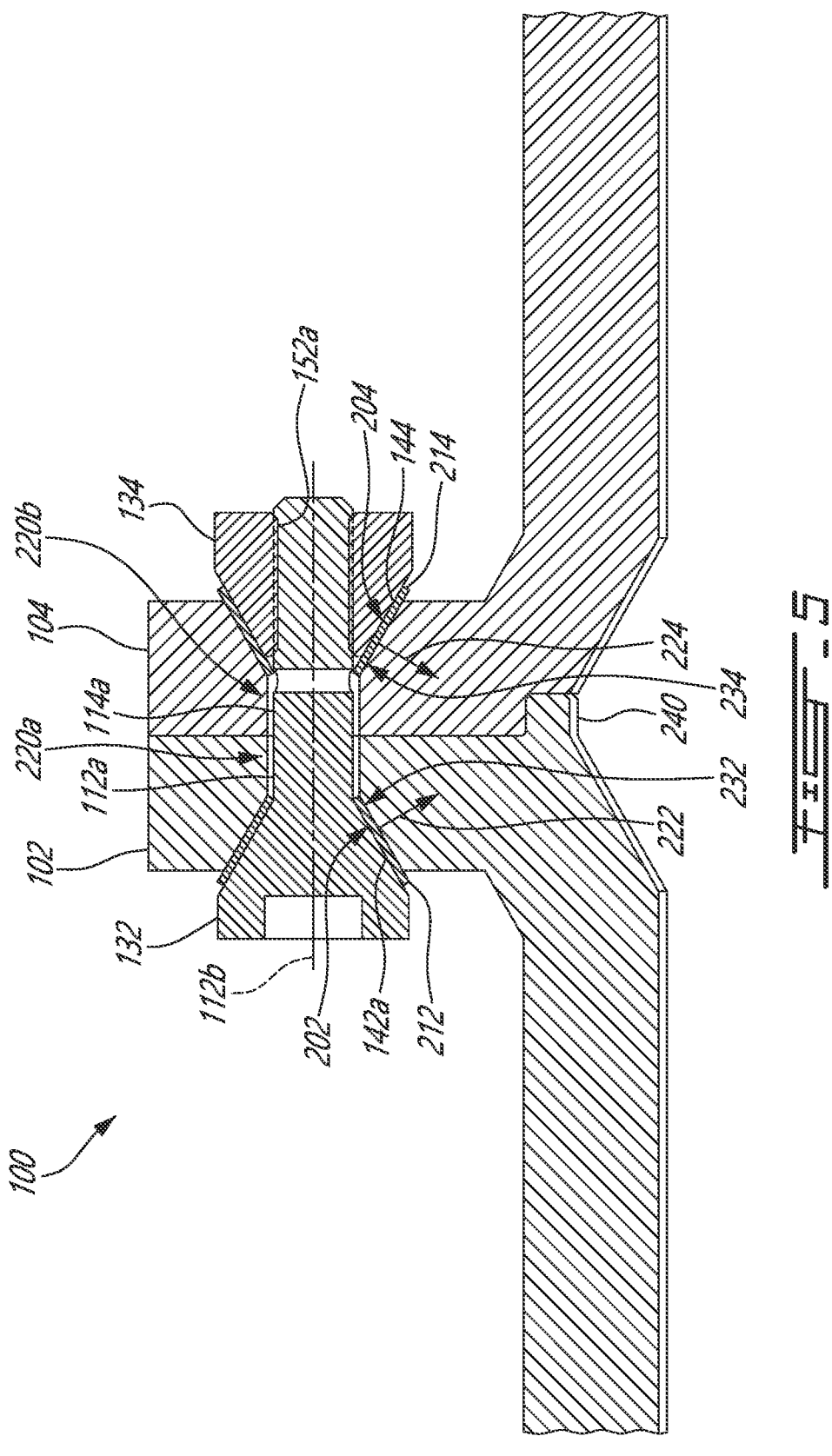
_Fig - 5_

Figure 10:
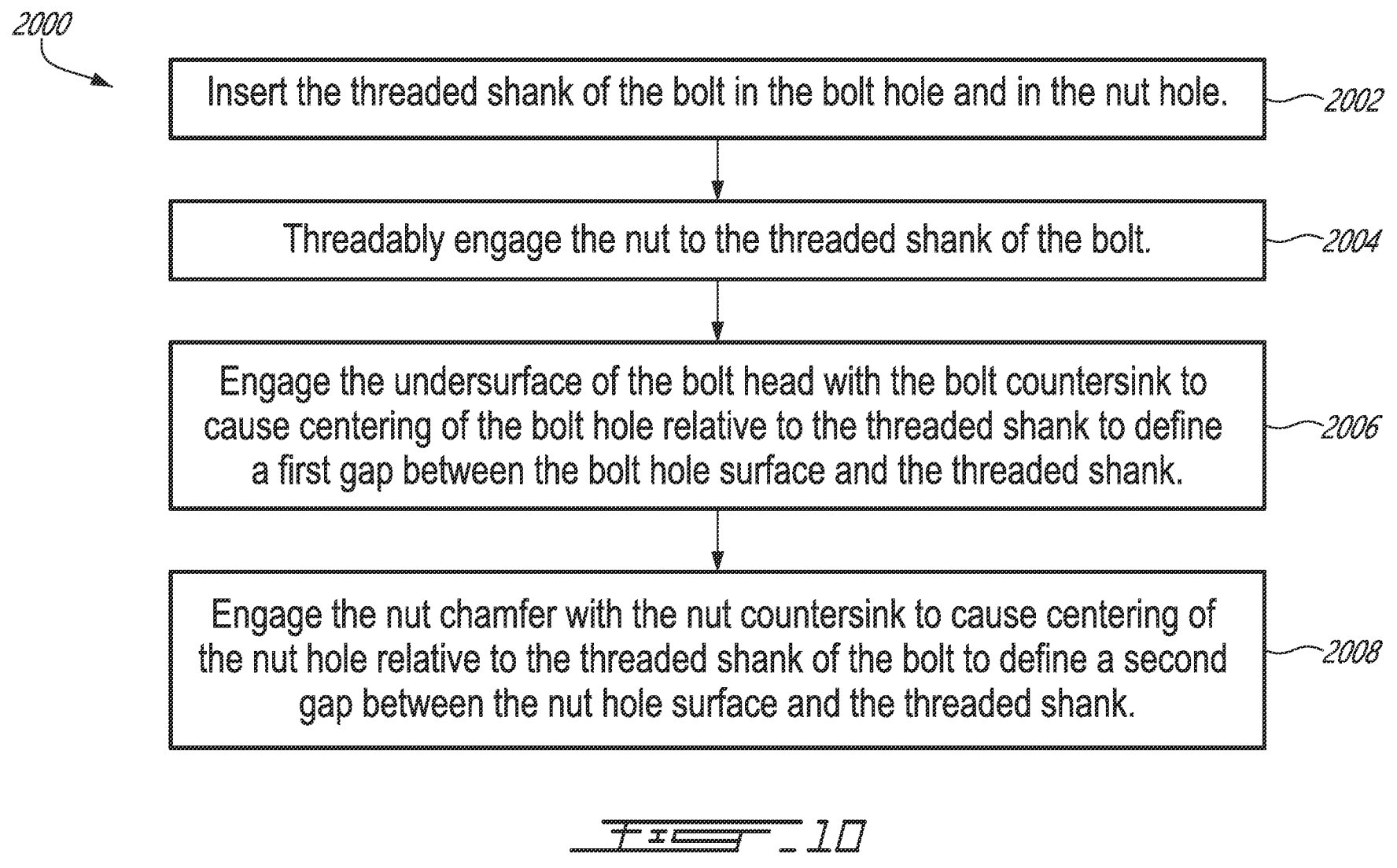

2002

Insert the threaded shank of the bolt in the bolt hole and in the nut hole.

2004

Threadably engage the nut to the threaded shank of the bolt.

2006

Engage the undersurface of the bolt head with the bolt countersink to cause centering of the bolt hole relative to the threaded shank to define a first gap between the bolt hole surface and the threaded shank.

2008

Engage the nut chamfer with the nut countersink to cause centering of the nut hole relative to the threaded shank of the bolt to define a second gap between the nut hole surface and the threaded shank.

FASTENING SYSTEM

TECHNICAL FIELD

The present application relates to fastening systems for aircraft applications.

BACKGROUND OF THE ART

The present disclosure relates generally to fastening systems.

As an example, in aircraft engines, some parts have flanges that are interconnected using bolted connection. The bolts and nuts used in such bolted connections may be subjected to high temperatures and/or to high mechanical loads, which may induce stress concentration areas on the bolts and/or nut, and affect their service life. It has been found that it is difficult to increase the durability of prior art bolts and nuts.

Therefore, while prior art bolts and nuts are suitable for their intended purposes, improvements can be made.

SUMMARY

In one aspect, there is provided a fastening system for an aircraft, including a first part of the aircraft, a second part of the aircraft, a bolt hole extending through the first part, the bolt hole including a bolt countersink and being defined by a bolt hole surface of the first part, a nut hole extending through the second part, the nut hole including a nut countersink and being defined by a nut hole surface of the second part, a bolt inserted in the bolt hole of the first part, the bolt having a shank including threads, and a bolt head with an undersurface complementarily shaped to the bolt countersink, a nut inserted in the nut hole of the second part, the nut having threads and having a nut chamfer complementarily shaped to the nut countersink, the shank extending in the nut hole, the nut being threaded onto the shank, the shank being dimensioned relative to the first part, the second part, the bolt hole and the nut hole such that the shank is spaced from one of or both of the bolt hole surface and the nut hole surface.

In another aspect, there is provided a method of fastening a first aircraft part with a second aircraft part using a bolt and a nut, the first aircraft part having a bolt hole extending therethrough, the bolt hole including a bolt countersink and being defined by a bolt hole surface of the first aircraft part, the second aircraft part defining a nut hole extending therethrough, the nut hole including a nut countersink and being defined by a nut hole surface of the second aircraft part, the bolt having a threaded shank and a bolt head with an undersurface complementarily shaped to the bolt countersink of the first aircraft part, the nut having a nut chamfer complementarily shaped to the nut countersink of the second aircraft part, the method including inserting the threaded shank of the bolt in the bolt hole of the first part and in the nut hole of the second part, threadably engaging the nut to the threaded shank of the bolt to fasten the first aircraft part with the second aircraft part using the bolt and the nut, and when the nut is being threadably engaged with the threaded shank, engaging the undersurface of the bolt head with the bolt countersink of the first aircraft part to cause centering of the bolt hole of the first aircraft part relative to the threaded shank of the bolt to define a first gap between the bolt hole surface and the threaded shank, and engaging the nut chamfer of the nut with the nut countersink of the second aircraft part to cause centering of the nut hole of the second aircraft part relative to the threaded shank of the bolt to define a second gap between the nut hole surface and the threaded shank.

DESCRIPTION OF THE DRAWINGS

Reference is now made to the accompanying figures in which:

FIG. 5 is a close-up, cross-sectional view of a portion of the fastening system of FIG. 3A;

FIG. 10 is a diagram showing a method of fastening a first aircraft part with a second aircraft part using a bolt and a nut.

DETAILED DESCRIPTION

Figure 1:
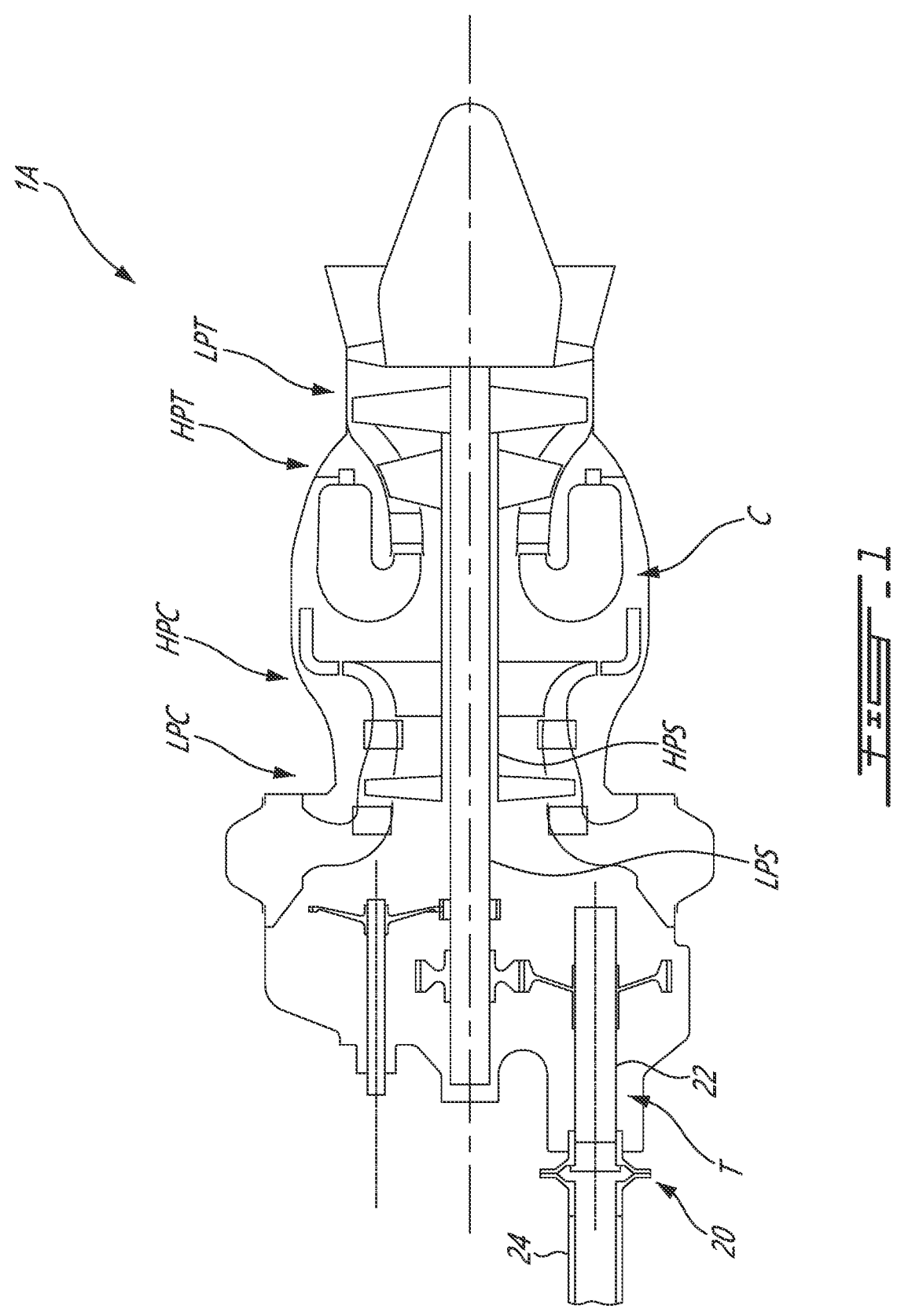
FIG. 1 is a schematic cross sectional view of an aircraft engine.

FIG. 1 illustrates an aircraft engine 1A, which may be part of an aircraft. In this example, the engine 1A is a turboshaft engine 1A, but could be any other type of aircraft engine. In this embodiment, the engine 1A includes in serial flow communication a low pressure compressor section (LPC) and a high pressure compressor section (HPC) for pressurizing air, a combustor (C) in which the compressed air is mixed with fuel and ignited for generating an annular stream of hot combustion gases, a high pressure turbine section (HPT), and a lower pressure turbine section (LPT). The respective pairs of the compressor and turbine sections are interconnected via respective independently rotatable low pressure and high pressure spools (LPS), (HPS). The engine 1A includes a transmission (T) driven by the low pressure turbine section (LPT) for outputting motive power to an aircraft. A flanged connection 20 is provided between a transmission output shaft 22 of the transmission (T) of the aircraft and a rotor shaft 24 to drive the rotor shaft 24. The rotor shaft 24 can be operatively connected to a propulsor of the aircraft, such as a propeller, a fan, or a helicopter rotor.

Figures 3A, 3B:
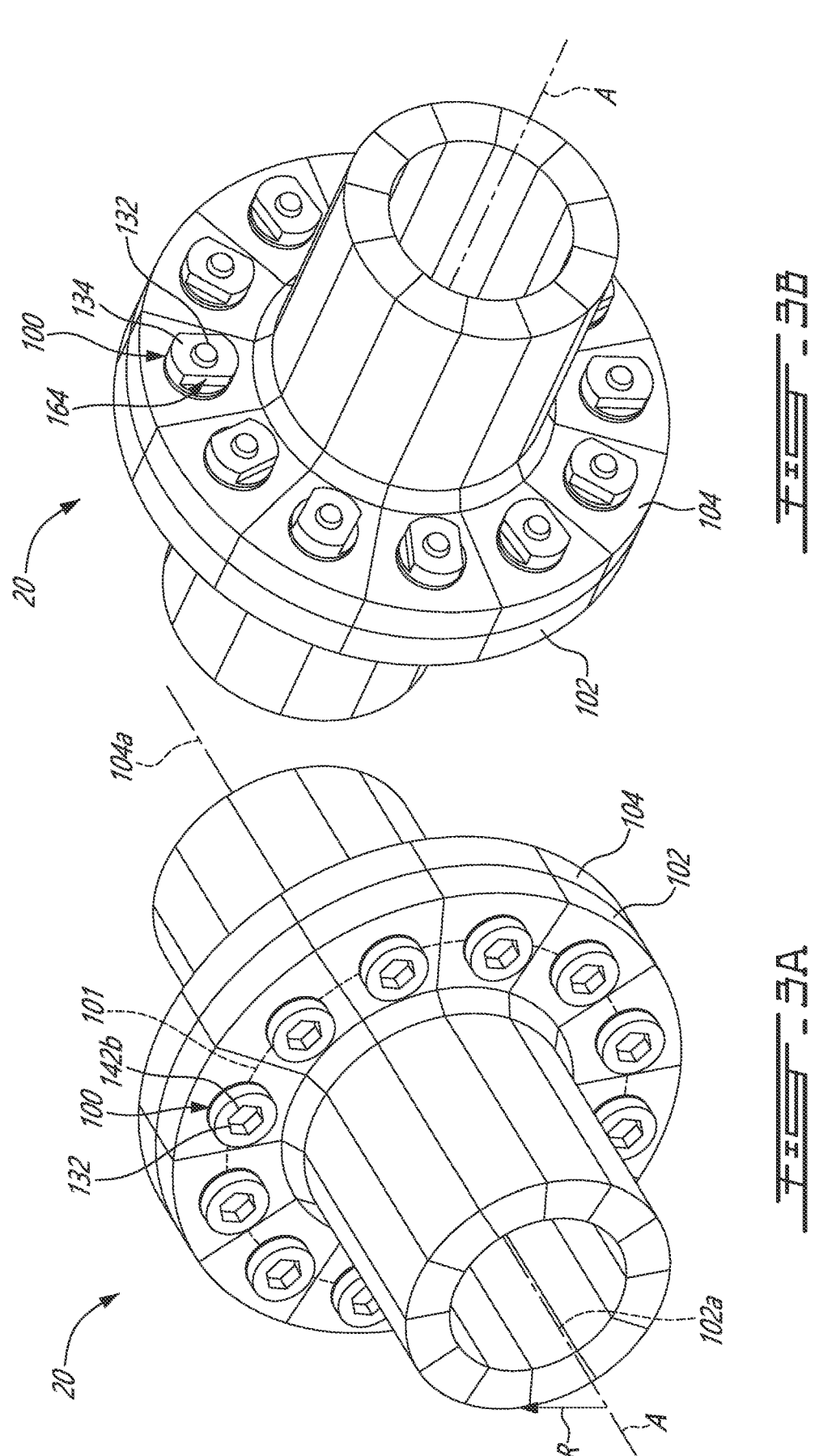
FIG. 3A is a front perspective view of a fastening system connecting together two flanged parts.
FIG. 3B is a rear perspective view of the fastening system of FIG. 3A.

Referring to FIGS. 3A and 3B, the flanged connection 20 is illustrated. The flanged connection 20 is provided by the fastening system 100 which is about to be described.

Figure 2:
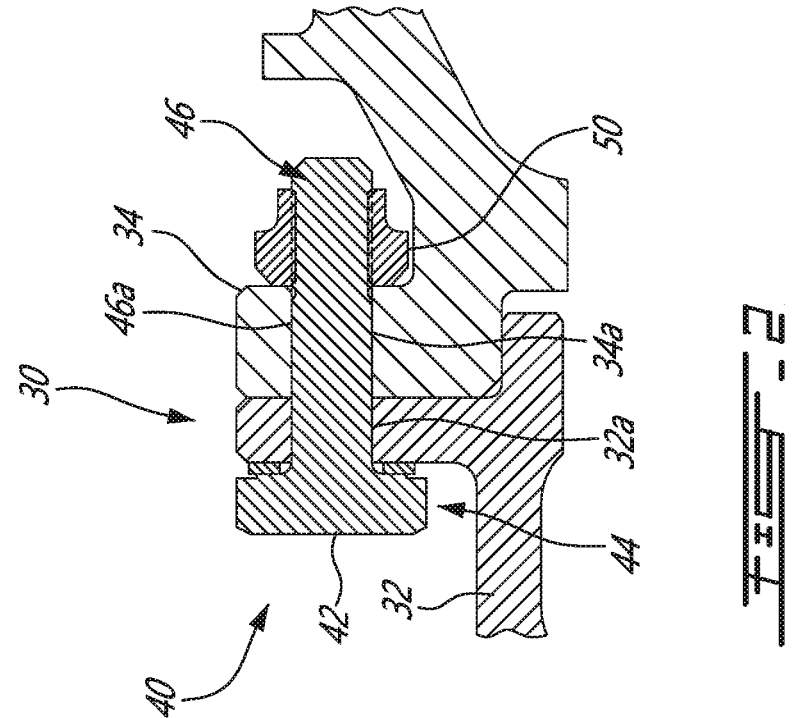
FIG. 2 is a close-up, cross sectional view of flanges connected together using prior art fasteners.

Before describing the fastening system 100, reference is made to FIG. 2 where a flanged connection 30 between parts 32, 34 is provided with a fastening system 40 known in the art. A bolt 42 has a head 44 and a threaded shank portion 46. When the bolt 42 is fully inserted in holes 32a, 34a defined in the respective parts 32, 34, a nut 50 threadably engages the shank portion 46 and cause the nut 50 and the head 44 to be urged toward the parts 32, 34 thus creating a clamping force. The parts 32, 34 are connected together through the friction created between the surfaces of the parts 32, 34 subjected to the clamping force, and via the shank portion 46 which has a line of contact 46a with some portion(s) of the surfaces defining the holes 32a, 34a. When the flanged connection 30 rotates at high speed and/or is subjected to high temperatures, the bolt 42 may be shifted, for example through radial and/or circumferential displacement, in the holes 32a, 34a because of centrifugal forces and/or thermal expansion. This displacement of the bolt 42 within holes 32a, 34a may create shear stress in the bolt 42 and/or stress concentration areas along the line of contact 46a, which is undesirable. As will become apparent from the following description, the present technology is directed to, amongst different aspects, mitigating at least some of these issues.

Referring back to FIGS. 3A and 3B, the fastening system 100 is illustrated. To clearly describe the present technology, it is often required to describe components and features that are at differing radial, axial and/or circumferential positions. As shown in FIG. 3A, the "A" axis represents an axial orientation. As used herein, the terms "axial" and/or "axially" refer to the relative position/direction of objects along axis A. As further used herein, the terms "radial" and/or "radially" refer to the relative position or direction of objects along a direction "R", which intersects axis A at only one location. In some embodiments, axis R is substantially perpendicular to axis A. Finally, the term "circumferential" refers to movement or position around axis A. The term "circumferential" may refer to a dimension extending around a center of a respective object.

Fastening systems 100 are circumferentially and equidistantly spaced across a bolt circle 101 defined on the flanged connection 20. For the sake of clarity, one fastening system 100 (i.e. the fastening system 100 located at the 12 o'clock position on the flanged connection 20) will be described. In addition, for generalisation purposes, the transmission output shaft 22 and the rotor shaft 24 will also be referred to as aircraft part 102 and aircraft part 104, as the fastening system 100 could be used to removably connect parts differing from flanges of a transmission output shaft and a rotor shaft of the aircraft engine 1A. Put differently, the fastening system 100 could be used to removably connect parts in different types of aircraft assemblies, involving rotating parts or non-rotating parts.

Figure 4:
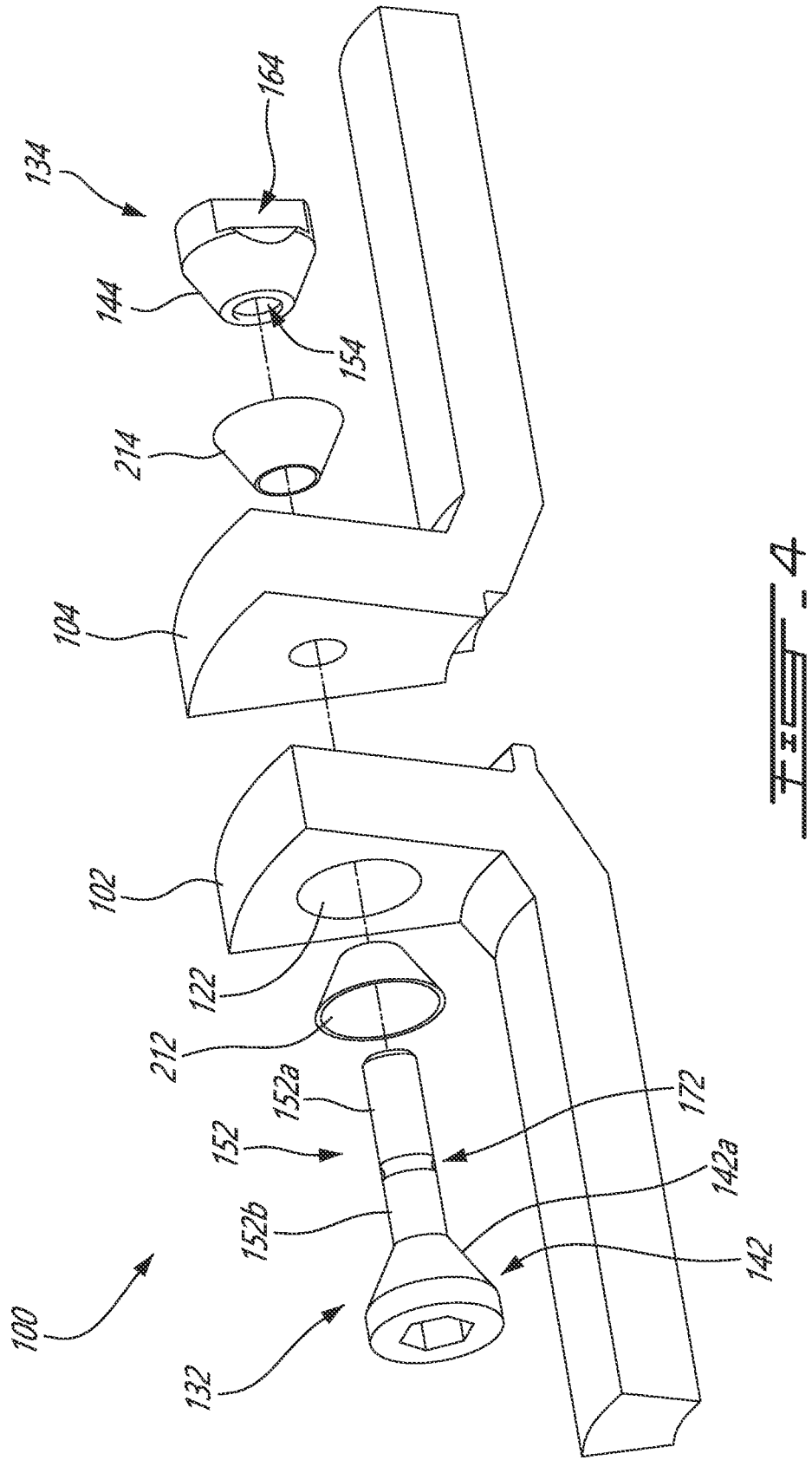
FIG. 4 is a front perspective, exploded view of a portion of the fastening system of FIG. 3A.
Figure 6:
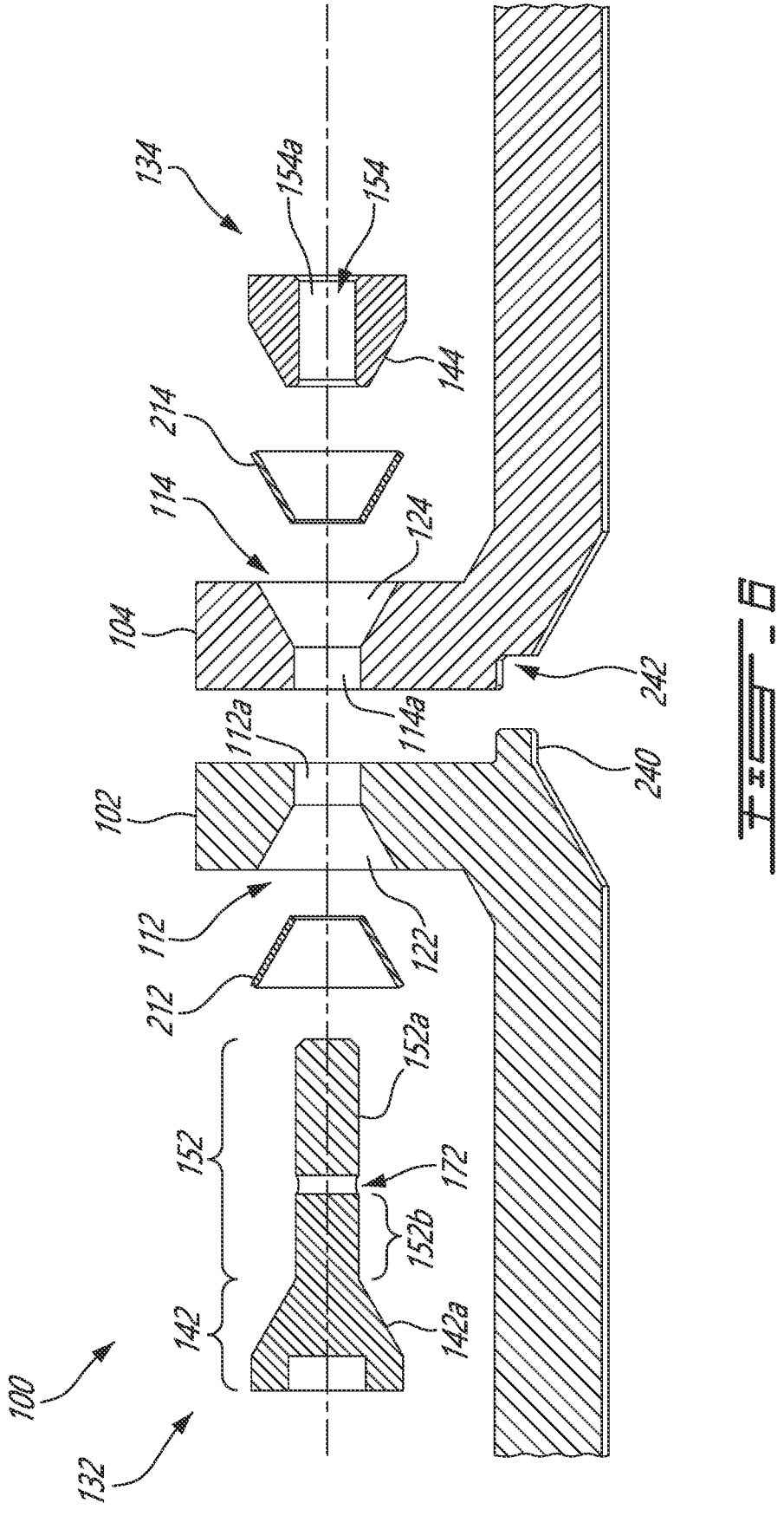
FIG. 6 is a close-up, cross-sectional and exploded view of the portion of the fastening system shown in FIG. 5.
Figure 7:
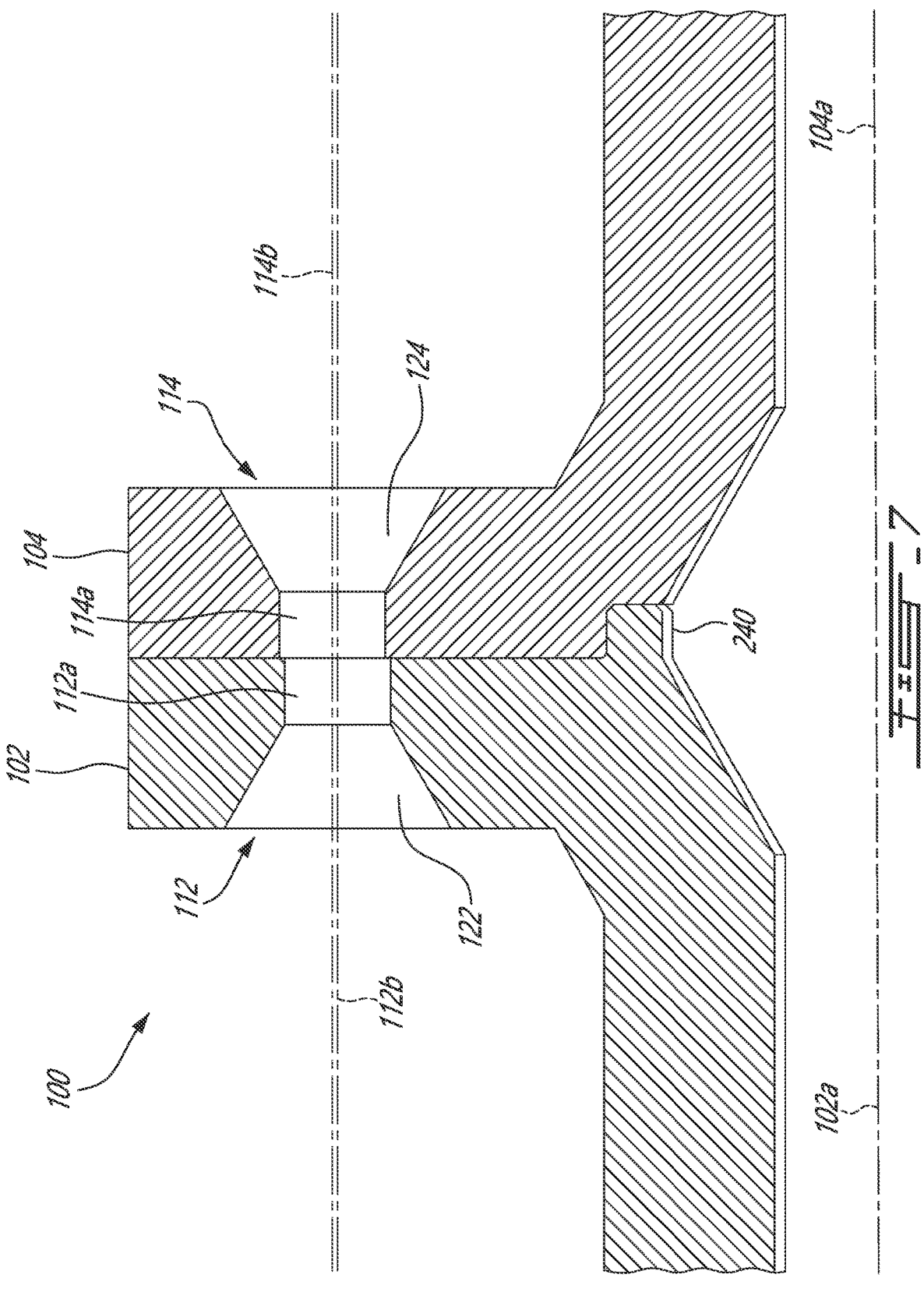
FIG. 7 is a close-up, cross-sectional view of a portion of the fastening system of FIG. 3A, with the bolt, nut and washers removed.
Figure 8:
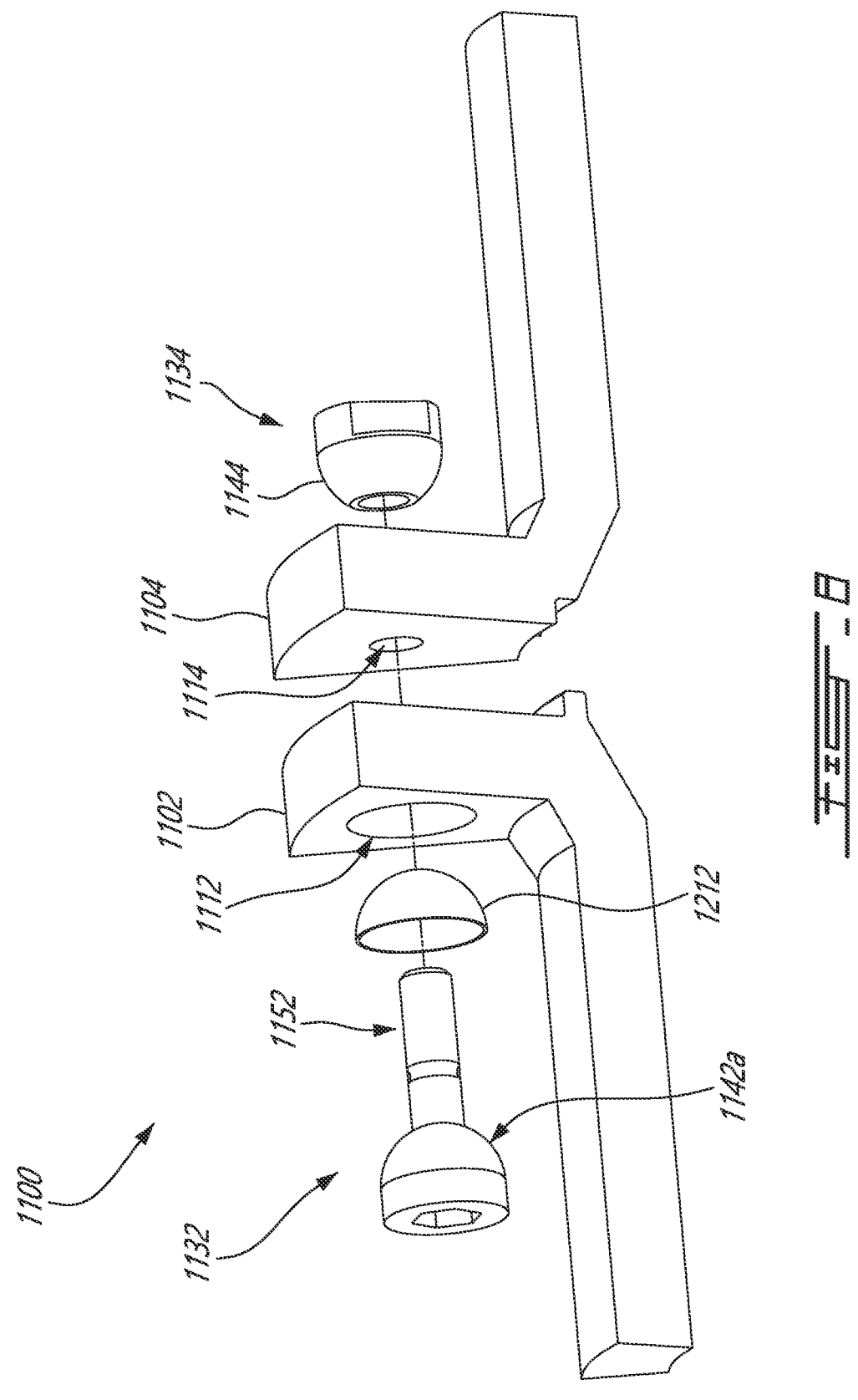
FIG. 8 is a front perspective, exploded view of the portion of a fastening system in accordance with another embodiment.
Figure 9:
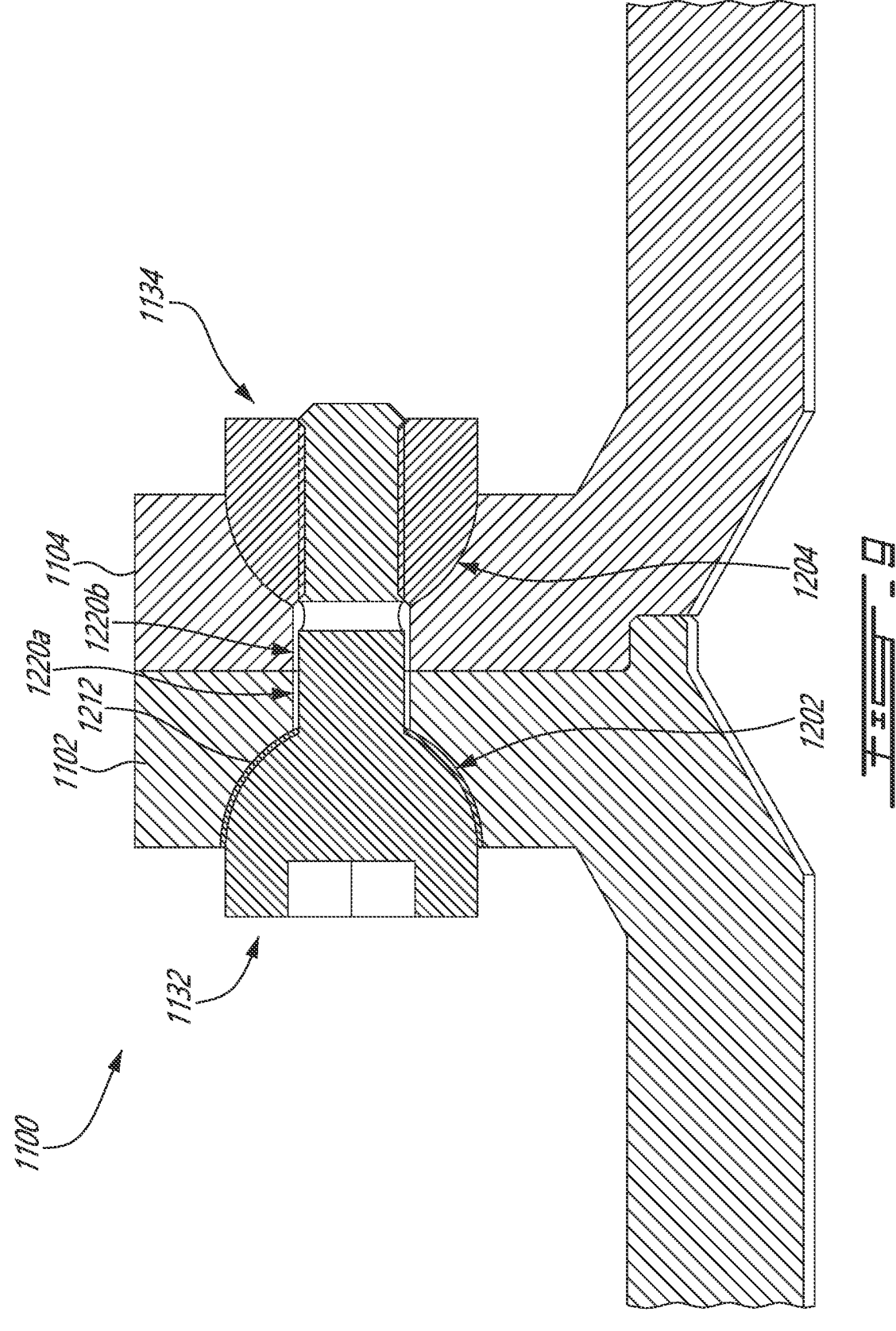
FIG. 9 is a close-up, cross-sectional view of the portion of the fastening system shown in FIG. 8.

Referring to FIGS. 3A to 7, the fastening system 100 is used to removably connect aircraft part 102 to aircraft part 104. The part 102 defines a longitudinal axis 102a (FIG. 7, not to scale). The part 102 has a bolt hole 112 extending therethrough. The bolt hole 112 is defined by a bolt hole surface 112a (FIG. 6) of the part 102. The bolt hole 112 defines a bolt hole axis 112b (FIG. 7). The bolt hole 112 is provided with a bolt countersink 122 (FIGS. 4 and 6). In the present description, the term "countersink" corresponds to a shaped enlargement at an end of a hole, and is not limited to be frustoconical. Other shapes are contemplated. The part 104 defines a longitudinal axis 104a (FIG. 7, not to scale). The part 104 has a nut hole 114 extending therethrough. The nut hole 114 is defined by a nut hole surface 114a (FIG. 6) of the part 104. The nut hole 114 defines a nut hole axis 114b (FIG. 7). The nut hole 114 is provided with a nut countersink 124.

The fastening system 100 further includes a bolt 132 insertable in the bolt hole 112. The bolt 132 has a bolt head 142 and a shank 152 (FIG. 6). Threads 152a are provided on a portion of the shank 152 (although not illustrated in the figures for the sake of clarity). A non-threaded portion 152b of the shank 152 extends between the bolt head 142 and the threads 152a. The shank 152 is dimensioned relative to the parts 102, 104, the bolt hole 112 and the nut hole 114 to be inserted in the bolt hole 112 and extend into the nut hole 114 when the parts 102, 104 are positioned for connection using the fastening system 100. A neck portion 172 (FIG. 6) is defined between the non-threaded portion 152b and the threads 152a. The neck portion 172 is provided to reduce the risks of fatigue rupture of the bolt 132, and to facilitate the forming of the threads 152a of the bolt 132 during manufacturing. The neck portion 172 could be omitted in some embodiments.

The bolt head 142 has an undersurface 142a that is complimentarily shaped to the bolt countersink 122. In this embodiment, the undersurface 142a and the bolt countersink 122 have a frustoconical shape. The configuration (angle, length, etc.) of the frustoconical shape of the undersurface 142a and the bolt countersink 122 could differ in other embodiments, and could be optimized for a given application. The undersurface 142a and the bolt countersink 122 define a bolt interface 202 (FIG. 5) between the bolt 132 and the part 102. As best seen in FIG. 3A, a driving feature 142b (i.e. a hexagonal hole) is provided in the bolt head 142 for driving the bolt 132. Different types of driving features (for example, internal or external) are contemplated. A bolt washer 212 is complementarily shaped to the undersurface 142a (i.e. frustoconical shape) is locatable between the undersurface 142a and the bolt countersink 122. The bolt washer 212 may be made of a more compliant material than the bolt 132 and/or the part 102 in order to compensate for any minute imperfections in the complementary surfaces of the undersurface 142a and the bolt countersink 122. The bolt washer 212 can also be used to achieve a repeatable coefficient of friction between the undersurface 142a and the bolt countersink 122. The bolt washer 212 could be omitted in some embodiments. The undersurface 142a and the bolt countersink 122 are the thrust surfaces that engage, whether directly or indirectly through the bolt washer 212, one another when the bolt 132 is urged toward the part 104. The frustoconical shape of the undersurface 142a and the bolt countersink 122 provides that the bolt interface 202 causes a self-centering of the bolt head 142 within the bolt hole 112, and of the shank 152 within the bolt hole 112 and the nut hole 114, when the bolt 132 is urged toward the part 104. The undersurface 142a and the bolt countersink 122 can be dimensioned to provide a relatively large area of contact therebetween compared to equivalently sized fastening systems known in the art, thereby reducing risks of stress concentration when, for example, rotating at high speed and at high temperatures.

Still referring to FIGS. 3A to 6, the fastening system 100 further includes a nut 134 insertable in the nut hole 114. The nut 134 has a nut chamfer 144 that is complimentarily shaped to the nut countersink 124. In the present description, the term "chamfer" corresponds to a shaped surface defining at least a portion of the outer surface of a component, i.e. in this case the nut 134, and is not limited to be frustoconically shaped. The nut 134 further has a central bore 154 (FIG. 6) with internal threads 154a (not illustrated for clarity) adapted for threaded engagement to the external threads 152a provided on the shank 152 of the bolt 132. In this embodiment, the nut chamfer 144 and the nut countersink 124 have a frustoconical shape. The configuration (angle, length, etc.) of the frustoconical shape of the nut chamfer 144 and the nut countersink 124 could differ in other embodiments, and could be optimized for a given application. The configuration of the frustoconical shape of the nut chamfer 144 and the nut countersink 124 may differ from the frustoconical shape of the undersurface 142a and the bolt countersink 122 in some embodiments. The nut chamfer 144 and the nut countersink 124 define a nut interface 204 (FIG. 5) between the nut 134 and the part 104. A nut washer 214 complementarily shaped to the nut chamfer 144 (i.e. frustoconical shape) is locatable between the nut chamfer 144 and the nut countersink 124. The nut washer 214 may be made of a more compliant material than the nut 134 and/or the part 104 in order to compensate for any minute imperfections in the complementary surfaces of the nut chamfer 144 and the nut countersink 124. The nut washer 214 can also be used to achieve a repeatable coefficient of friction between the nut chamfer 144 and the nut countersink 124. The nut washer 214 could be omitted in some embodiments. The nut chamfer 144 and the nut countersink 124 are the thrust surfaces that engage, whether directly or indirectly through the nut washer 214, one another when the nut 134 is urged toward the part 102. The nut chamfer 144 and the nut countersink 124 can be dimensioned to provide a relatively large area of contact therebetween compared to equivalently sized fastening systems known in the art, thereby reducing risks of stress concentration when, for example, rotating at high speed and at high temperatures. The nut 134 further has a series of known type wrench-receiving recesses 164 formed in the outer face thereof for holding the nut 134 when tightened. The frustoconical shape of the nut chamfer 144 and the nut countersink 124 provides that the nut interface 204 causes a self-centering of the nut 134 within the nut hole 114 when the nut 134 is urged toward the part 102 as the threads 152a of the bolt 132 threadably engage the threads 154a of the nut 134.

To summarize and with the above structure in mind, when the bolt 132 is inserted in the bolt hole 112 with the shank 152 extending through the bolt hole 112 and into the nut hole 114, the nut 134 is inserted in the nut hole 114 and the shank 152 threadably engages the nut 134, the shank 152 is dimensioned relative to the parts 102, 104, the bolt hole 112 and the nut hole 114 such that the shank 152 is spaced from both the surfaces 112a, 114a defining the bolt hole 112 and the nut hole 114 respectively. There is thus a gap 220a (FIG. 5) that extends radially between the shank 152 and the surface 112a, and a gap 220b that extends radially between the shank 152 and the surface 114a. The gaps 220a, 220b are not necessarily shown to scale in the Figures. Both gaps 220a, 220b are uniform in the radial direction and circumferentially around the shank 152. The gaps 220a, 220b are also equal, but it is contemplated that the gaps 220a, 220b could differ from one another in some embodiments. The gaps 220a, 220b are maintained uniform because of the shape and configuration of the bolt and nut interfaces 202, 204 which self-center the shank 152 within the bolt hole 112 and the nut hole 114. The gap 220b is thus maintained between, for example, the neck portion 172 of the bolt 132 and the surface 114a defining the nut hole 114. The self-centering of the bolt 132 relative to the bolt hole 112 and the nut hole 114 reduces the possibility of radial and/or circumferential displacement of the bolt 132 and the nut 134 as the radial and/or circumferential displacement is counter-reacted by an incremental increase in axial load of the bolt 132. In addition, since there is no contact between the shank 152 and the surfaces 112a, 114a, there is no shear stress that is induced in the bolt 132 through contact with the surfaces 112a, 114a.

Referring to FIG. 5, the bolt and nut interfaces 202, 204 will be further described. A cross-sectional direction 222 extends normal to the bolt interface 202. A cross-section direction 224 extends normal to the nut interface 204. The direction 222 is skewed (i.e. non parallel) relative to the direction 224. Put differently, the bolt interface 202 defines a frustoconical bolt interface surface 232 that is converging toward the bolt hole axis 112b between the bolt countersink 122 and the narrower portion of the bolt hole 112. Similarly, the nut interface 204 defines a frustoconical nut interface surface 234 that is converging toward the nut hole axis 114b between the nut chamfer 144 and the narrower portion of the nut hole 114. It is also noted that a diameter of the shank 152 is smaller than the diameter of the narrower portion of the bolt hole 112, and smaller than the diameter of the narrower portion of the nut hole 114. When the bolt 132 is tightened to the nut 134, loads are applied onto the bolt and nut interfaces 202, 204 along the directions 222, 224, which cause the shank 152 to remain spaced from the surfaces 112a, 114a and thus define the gaps 220a, 220b. This configuration is also less sensitive to stresses induced by thermal expansion. Moreover, the area of the bolt and nut interfaces 202, 204 may be selected to provide an increased surface area over which the loads are applied, which can allow for the use of materials forming any one of the components of the fastening system 100 to have reduced mechanical properties (i.e. tensile strength) compared to other specialty materials used, for example, in aerospace applications. This can lead to costs reduction compared to traditional fastening systems.

Referring now to FIGS. 5 to 7, the part 102 has a spigot 240 protruding axially therefrom. The part 104 has a recess 242 defined therein and adapted for receiving the spigot 240 therein. As best seen in FIG. 7, when the parts 102, 104 are positioned for connection using the fastening system 100, the longitudinal axes 102a, 104a are coaxial (not to scale in FIG. 7), the spigot 240 is received in the recess 242, and the bolt hole axis 112b extends parallel to, but not coaxial with, the nut hole axis 114b. The bolt hole axis 112b and the nut hole axis 114b are purposely radially offset, but because of the self-centering feature of the fastening system 100 and the fact that the fastening systems 100 are equidistantly spaced across the bolt circle 101, additional radial loads are exerted on the spigot 240 when the bolt 132 is tightened to the nut 134. The radial offset and the diameter of the holes 112, 114 are selected to allow for the shank 152 of the bolt 132 to be inserted in the nut hole 114 notwithstanding the radial offset. Such a configuration can be useful in scenarios where engagement of the spigot 240 with the recess 242 through positive contact load on the spigot 240 is to be maintained across a wide range of operating and/or thermal conditions.

Referring to FIGS. 8 to 11, there will be briefly described the fastening system 1100. The fastening system includes features that are the same as or similar to those of the fastening system 100. Therefore, for simplicity, features of the fastening system 1100 that are the same as or similar to those of the fastening system 100 have been labeled with the same reference numerals, but in the 1000 series (for example, bolt 132 corresponds to bolt 1132), and will not be described again in detail.

The fastening system 1100 is used to connect parts 1102, 1104 together. The fastening system 1100 differs from the fastening system 100 in that the bolt hole 1112, the nut hole 1114, the undersurface 1142a, the bolt washer 1212, and the nut chamfer 1144 have a hemispherical shape. The hemispherical shape causes similar self-centering feature as the frustoconical shape provided in the components of the fastening system 100. Note that no nut washer is used in the fastening system 1100, but a hemispherical nut washer could be used in some embodiments. It is also contemplated that the bolt washer 1212 could be omitted in some embodiments. The gaps 1220a, 1220b are maintained uniform because of the shape and configuration of the bolt and nut interfaces 1202, 1204 which self-center the shank 1152 within the bolt hole 1112 and the nut hole 1114.

With the above description in mind and now referring to FIG. 10, the present technology provides for a method 2000 of fastening the aircraft part 102 with the aircraft part 104 using the bolt 132 and the nut 134. The method 2000 includes at step 2002 inserting the threaded shank 152 of the bolt 132 in the bolt hole 112 and in the nut hole 134. Step 2004 includes threadably engaging the nut 134 to the threaded shank 152 to fasten the part 102 with the part 104 using the bolt 132 and the nut 134. When the nut 134 is threadably engaged with the threaded shank 152, the method 2000 further includes the step 2006 of engaging the undersurface 142a of the bolt head 142 with the bolt countersink 122 of the aircraft part 102 to cause centering of the bolt hole 112 of the aircraft part 102 relative to the threaded shank 152 of the bolt 132 to define the gap 220a between the bolt hole surface 112a and the threaded shank 152. The method 2000 further includes the step 2008 of engaging the nut chamfer 144 of the nut 134 with the nut countersink 124 of the aircraft part 104 to cause centering of the nut hole 114 of the aircraft part 104 relative to the threaded shank 152 of the bolt 132 to define the gap 220b between the nut hole surface 114a and the threaded shank 152. The method 2000 may further include the optional steps of receiving the bolt washer 212 complimentarily shaped to the undersurface 142a, and locating the bolt washer 212 between the undersurface 142a and the bolt countersink 122 before threadably engaging the nut 134 with the threaded shank 152. The method 2000 may further include the optional steps of receiving the nut washer 214 complimentarily shaped to the nut chamfer 144, and locating the nut washer 214 between the nut chamfer 144 and the nut countersink 124 before threadably engaging the nut 134 with the threaded shank 152. In some embodiments, the order of the steps of the method 2000 may differ from the order presented above.

The above description is meant to be exemplary only, and one skilled in the art will recognize that changes may be made to the embodiments described without departing from the scope of the technology disclosed herein. Still other modifications which fall within the scope of the present technology will be apparent to those skilled in the art, in light of a review of this disclosure, and such modifications are intended to fall within the appended claims.

The invention claimed is:

1. A method of fastening a first aircraft part with a second aircraft part using a bolt and a nut, the first aircraft part having a bolt hole extending therethrough, the bolt hole including a bolt countersink and being defined by a bolt hole surface of the first aircraft part, the second aircraft part defining a nut hole extending therethrough, the nut hole including a nut countersink and being defined by a nut hole surface of the second aircraft part, the bolt having a threaded shank and a bolt head with an undersurface complementarily shaped to the bolt countersink of the first aircraft part, the nut having a nut chamfer complementarily shaped to the nut countersink of the second aircraft part, the method comprising:

inserting the threaded shank of the bolt in the bolt hole of the first aircraft part and in the nut hole of the second aircraft part;

threadably engaging the nut to the threaded shank of the bolt to fasten the first aircraft part with the second aircraft part using the bolt and the nut; and when the nut is being threadably engaged with the threaded shank:

engaging the undersurface of the bolt head with the bolt countersink of the first aircraft part to cause centering of the bolt hole of the first aircraft part relative to the threaded shank of the bolt to define a first gap between the bolt hole surface and the threaded shank; and engaging the nut chamfer of the nut with the nut countersink of the second aircraft part to cause centering of the nut hole of the second aircraft part relative to the threaded shank of the bolt to define a second gap between the nut hole surface and the threaded shank;

wherein the first aircraft part includes a spigot protruding therefrom and the second aircraft part defines a recess adapted for receiving the spigot therein, and when the nut is being threadably engaged with the threaded shank, the spigot is subjected to radial loads for maintaining engagement of the spigot with the recess.

2. The method of claim 1, wherein the first and second gaps are uniform in a radial direction and circumferentially around the threaded shank.

3. The method of claim 1, wherein the first and second aircraft parts are flanges of rotating components of an aircraft engine.

4. The method of claim 1, wherein at least one of the undersurface and the nut chamfer has a frustoconical shape.

5. The method of claim 1, wherein at least one of the undersurface and the nut chamfer has a hemispherical shape.

6. The method of claim 1, further comprising at least one of:

receiving a bolt washer complementarily shaped to the undersurface, and locating the bolt washer between the undersurface and the bolt countersink before threadably engaging the nut to the threaded shank; and receiving a nut washer complementarily shaped to the nut chamfer, and locating the nut washer between the nut chamfer and the nut countersink before threadably engaging the nut to the threaded shank.

* * * * *